(12) United States Patent
Mäkelä

(10) Patent No.: US 9,507,811 B2
(45) Date of Patent: Nov. 29, 2016

(54) COMPRESSED DATA PAGE WITH UNCOMPRESSED DATA FIELDS

(75) Inventor: Marko Mäkelä, Vantaa (FI)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1733 days.

(21) Appl. No.: 12/317,349

(22) Filed: Dec. 22, 2008

(65) Prior Publication Data

US 2010/0161567 A1    Jun. 24, 2010

(51) Int. Cl.
*G06F 17/30* (2006.01)

(52) U.S. Cl.
CPC ... *G06F 17/30312* (2013.01); *G06F 17/30501* (2013.01); *G06F 17/30076* (2013.01); *G06F 17/30587* (2013.01)

(58) Field of Classification Search
CPC .............. G06F 17/30153; G06F 17/30501; G06F 2212/401; G06F 2211/1014; G06F 3/0608; G06F 12/1408; G06F 17/30076; G06F 17/30312; G06F 17/30587; H03M 7/30
USPC .......................................................... 707/693
See application file for complete search history.

(56) References Cited

U.S. PATENT DOCUMENTS

| | | | | | |
|---|---|---|---|---|---|
| 5,247,638 | A | * | 9/1993 | O'Brien | G06F 3/0601 341/87 |
| 5,684,478 | A | * | 11/1997 | Panaoussis | H03M 7/30 341/106 |
| 5,794,228 | A | * | 8/1998 | French | G06F 17/30324 |
| 5,953,017 | A | * | 9/1999 | Beach | G06F 3/0481 345/440 |
| 6,240,419 | B1 | * | 5/2001 | Franaszek | 707/693 |
| 6,633,674 | B1 | * | 10/2003 | Barnes | G06T 3/4084 375/E7.013 |
| 6,956,507 | B2 | * | 10/2005 | Castelli et al. | 341/50 |
| 7,966,298 | B2 | * | 6/2011 | Bruso et al. | 707/675 |
| 2002/0099907 | A1 | * | 7/2002 | Castelli | G06F 12/0871 711/113 |
| 2005/0022175 | A1 | * | 1/2005 | Sliger et al. | 717/169 |
| 2006/0112152 | A1 | * | 5/2006 | Napier et al. | 707/203 |
| 2007/0061546 | A1 | * | 3/2007 | Berger | H03M 7/30 711/202 |
| 2007/0300206 | A1 | * | 12/2007 | Petrov et al. | 717/122 |
| 2008/0155342 | A1 | * | 6/2008 | O'Callahan | 714/38 |
| 2008/0228795 | A1 | * | 9/2008 | Lomet | 707/101 |
| 2009/0106281 | A1 | | 4/2009 | Marwah et al. | |
| 2009/0276430 | A1 | * | 11/2009 | Bruso et al. | 707/8 |
| 2010/0082545 | A1 | * | 4/2010 | Bhattacharjee et al. | 707/641 |

OTHER PUBLICATIONS

Marko Makela, Comp.compression, Estimating LZ77 Compression Ratio?, http://groups.google.com/group/comp.compression/browse_thread/thread/3df481f18d0e0a0, Sep. 3, 2008.

* cited by examiner

*Primary Examiner* — Tuan A Pham
*Assistant Examiner* — Merilyn Nguyen
(74) *Attorney, Agent, or Firm* — Kraguljac Law Group, LLC (57) ABSTRACT

Systems, methods, and other embodiments associated with a compressed data page that includes uncompressed data fields are described. One example method includes compressing user records and storing them on a compressed data page and then storing one or more uncompressed data fields on the compressed data page such that the uncompressed data fields can be updated in place without uncompressing the compressed data page.

20 Claims, 5 Drawing Sheets

COMPRESSED DATA PAGE WITH UNCOMPRESSED DATA FIELDS

BACKGROUND

Database memory management systems that handle large amounts of data typically store the bulk of user records in compressed page form. These compressed pages are stored in long term storage in a high capacity storage device, such as a hard disk. Whenever a change is made to a user record, the compressed memory page is fetched from the storage device and stored in operating memory. Once the compressed memory page is in operating memory, the page is uncompressed so that the affected user record can be changed.

Some databases store large amounts of user records that are rarely edited but are often deleted. One example of user records that are rarely edited are addresses included in a mailing list. Addresses are often removed from these lists but the address information is rarely updated. Hence, the processing resources necessary to uncompress and re-compress a data page are often employed simply to delete a record or to perform other operations that do not require access to the contents of the compressed user records themselves.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

A compressed data page is provided that includes one or more data fields that are maintained in an uncompressed form on the compressed data page. This allows these data fields to be overwritten "in place" without having to decompress and then re-compress the updated uncompressed page, saving time and processing capacity. User records and indexes stored on the page are input to a compression algorithm, such as, for example, the LZ77 compression algorithm. These types of fields tend to compress well and in a fairly predictable manner. The data fields that are stored on the compressed page in uncompressed form include system information that typically is in the form of pointers and binary counters. In general, these types of fields do not benefit much from compression due to their random nature. Since the uncompressed data fields are not input to the compression algorithm, the compression ratio is not affected by them, resulting in a relatively consistent compression ratio.

The data fields that are stored in uncompressed form on the compressed page may include pointers to columns of data, typically longer columns of TEXT, BLOB, or VARCHAR data that are stored off page in specially designated overflow pages. These overflow pages thus contain columns of data that will typically benefit significantly from compression, resulting in substantial memory savings while resulting in a single pointer on the "parent" page to the column of data on the overflow page.

The data fields that are stored in uncompressed form on the compressed page may include a dense page directory that includes an array of pointers to records within the uncompressed page. The array of pointers is ordered according to the key. One or more flags may be appended to each pointer. For example, a "delete-mark flag" may be appended to each pointer. When a record is deleted, this flag can be updated in place without decompressing the page. The uncompressed page may include a "record list" that is maintained as a singly-linked list of user records in alphabetical order, and a "free list" that is maintained as a singly-linked list of purged records. Both lists can be represented by the dense page directory on the compressed page. Thus a record may be purged by manipulating the arrays in the dense page directory and free list without decompressing the page.

One memory management scheme that benefits from use of a compressed data page that includes uncompressed data fields is a system in which the compressed memory page is constrained to a fixed size. A fixed compressed page size simplifies free space management of the compressed pages. Because the compression ratio of the described compressed page that includes uncompressed data fields is relatively consistent, it easier to predict when a compressed version of a uncompressed data page will exceed the fixed size limit. When it is predicted that the compressed data page size will exceed the fixed size limit, the memory page can be split prior to compression. Another memory management scheme that benefits from use of a compressed data page includes a buffer pool that stores both a compressed page and its corresponding uncompressed memory page in operating memory. When it is predicted, based on the modification log on the compressed data page, that the compressed data page size will exceed the fixed size limit the uncompressed data page may be compressed.

The compressed data page that includes uncompressed data fields will be described herein in a specific memory management system. However, it will be apparent to one of skill in the art that the compressed data page can be employed advantageously in any number of memory management systems.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
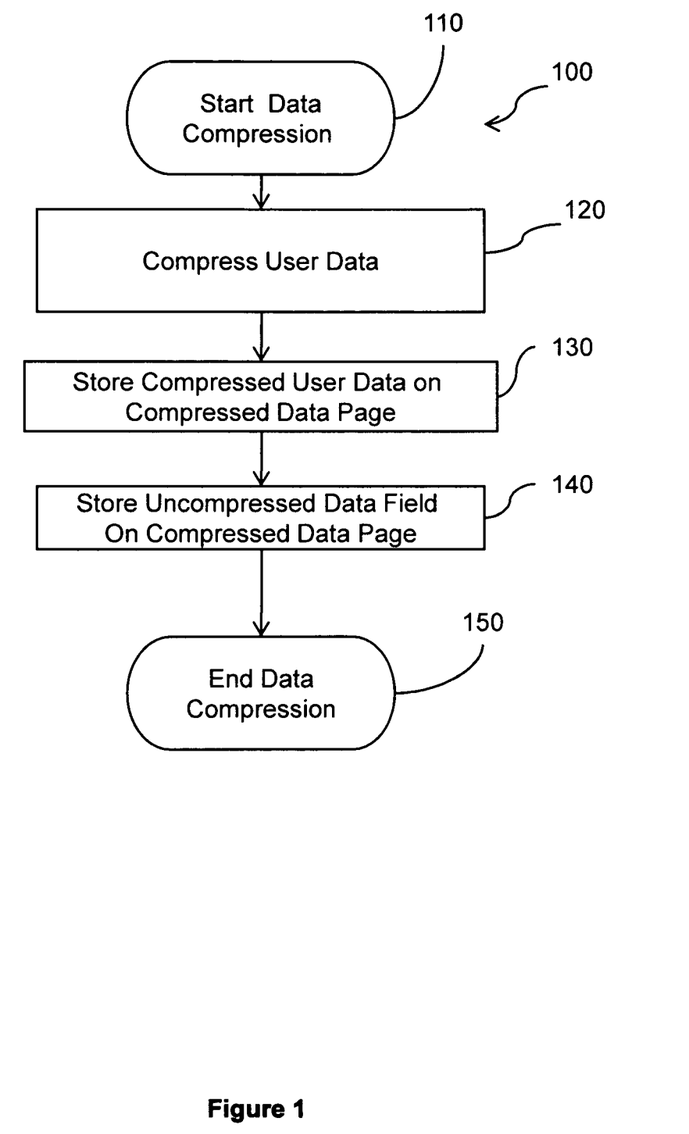
FIG. 1 illustrates an example embodiment of a method associated with constructing a compressed data page that includes uncompressed data fields.

FIG. 1 illustrates a method 100 associated with compressing an uncompressed data page to make a compressed data page that includes uncompressed data fields and compressed user data. At 110 the compression method begins. At 120 the user data, such as user records, is compressed according to a compression scheme. At 130 the compressed user data is stored on a compressed data page. At 140 at least one uncompressed data field is stored in uncompressed form on the compressed data page. The compression method ends at 150. The at least one uncompressed data field on the compressed data page can be updated in place on the compressed data page.

In one example embodiment, the uncompressed data fields include page header fields that are stored in uncompressed form on the compressed data page. Among other things, the page header includes fields that store a pointer to a top of the heap of user records, a number of bytes in the purged records on the page, a pointer to the last inserted record, and the number of user records on the page. The fact that these fields can be updated in place allows, for example, a record to be purged from the data page without necessitating decompression of the page.

In other example embodiments, the uncompressed data fields include a transaction identifier, a transaction undo log pointer, and a node pointer that are stored in uncompressed form on the compressed data page. The transaction identifier identifies the highest identifier of a transaction that may have changed a record on the page. The transaction undo log pointer, or rollback pointer, is used to point to a memory location that stores a previous version of data that was changed in a recent transaction. The node pointer points towards a leaf of the B-tree. The node pointer may be updated when a memory page is split during insertion of a new record or when memory pages are merged during purging of a record. All of these fields can be updated in place so that decompression of the page is not necessary to effectuate changes to them.

In one example embodiment, the uncompressed data fields include an off-page column pointer that is stored in uncompressed form on the compressed data page. An off-page column pointer points to user data that is stored off page. Hence, if a new record is inserted that includes columns that are stored off page, the off-page column pointer can be updated after the column has been stored without decompression of the page.

In example embodiment, a dense page directory is constructed that includes an array of pointers to each user record. The dense page directory is stored in uncompressed form on the compressed page. The dense page directory points to every user record contained on the page, including purged records in a free list. The dense page directory is indexed in the collation order, i.e., in the order in which the record list is linked on the uncompressed page. A delete mark flag may be associated with each pointer in the array. The delete mark flag may be set when a corresponding user record is to be deleted without decompressing the page. Purging of a delete-marked record may thus be accomplished in place on the compressed page by moving elements in the dense page directory and adjusting elements in the page header fields. For example, the header field that stores the number of records on the page may be decremented, the purged record may be made the new head of the free list, and the amount of free space on the page may be adjusted to reflect the fact that a record has been purged.

In one example embodiment, the uncompressed page includes a sparse page directory that includes pointers to a subset of user records. In this case, a sparse directory flag may be associated with each pointer in the dense page directory's pointer array. The sparse directory flag is set on each pointer in the array that points to a user record included in the sparse page directory. When the compressed page is decompressed this flag is used to identify records that are part of the sparse page directory.

In one example, a modification log is maintained on the compressed page that records changes to user records stored on the compressed page. This modification log can be used to reconstruct an uncompressed version of the compressed page. It may be desirable to reconstruct the uncompressed version of the compressed page when the uncompressed version is deleted from operating memory or becomes corrupted. To reconstruct the uncompressed version, the compressed data on the compressed data page is uncompressed. The uncompressed user records are then modified to reflect the changes recorded in the modification log and the uncompressed data page is re-compressed.

In one example embodiment, the modification log is used to predict when a compressed page version of a given uncompressed data page will exceed a fixed compressed page size limit. To maintain the fixed compressed page size, the uncompressing and modification of the uncompressed data page is performed when a predicted resultant compressed page size that is determined using the modification log reaches a predetermined size. The modified uncompressed data page is then compressed. Alternatively, an uncompressed data page that corresponds to the compressed data page can be compressed when the predicted resultant compressed page size reaches a predetermined size. The re-compressed data page may be split when the size of the re-compressed data page exceeds the predetermined size. In one example embodiment, free space is included in the compressed data page such that the compressed data page occupies a predetermined amount of memory.

While FIG. 1 illustrates various actions occurring in serial, it is to be appreciated that various actions illustrated in FIG. 1 could occur substantially in parallel. By way of illustration, a first process could compress user records, a second process could transfer uncompressed fields to the compressed page, and a third process could update uncompressed fields in place. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes compressing the user records according to a compression scheme; storing the compressed user data on a compressed data page; and storing at least a portion of the uncompressed system information fields in uncompressed form on the compressed data page. While executable instructions associated with the above method are described as being stored on a computer-readable medium, it is to be appreciated that executable instructions associated with other example methods described herein may also be stored on a computer-readable medium.

Figure 2:
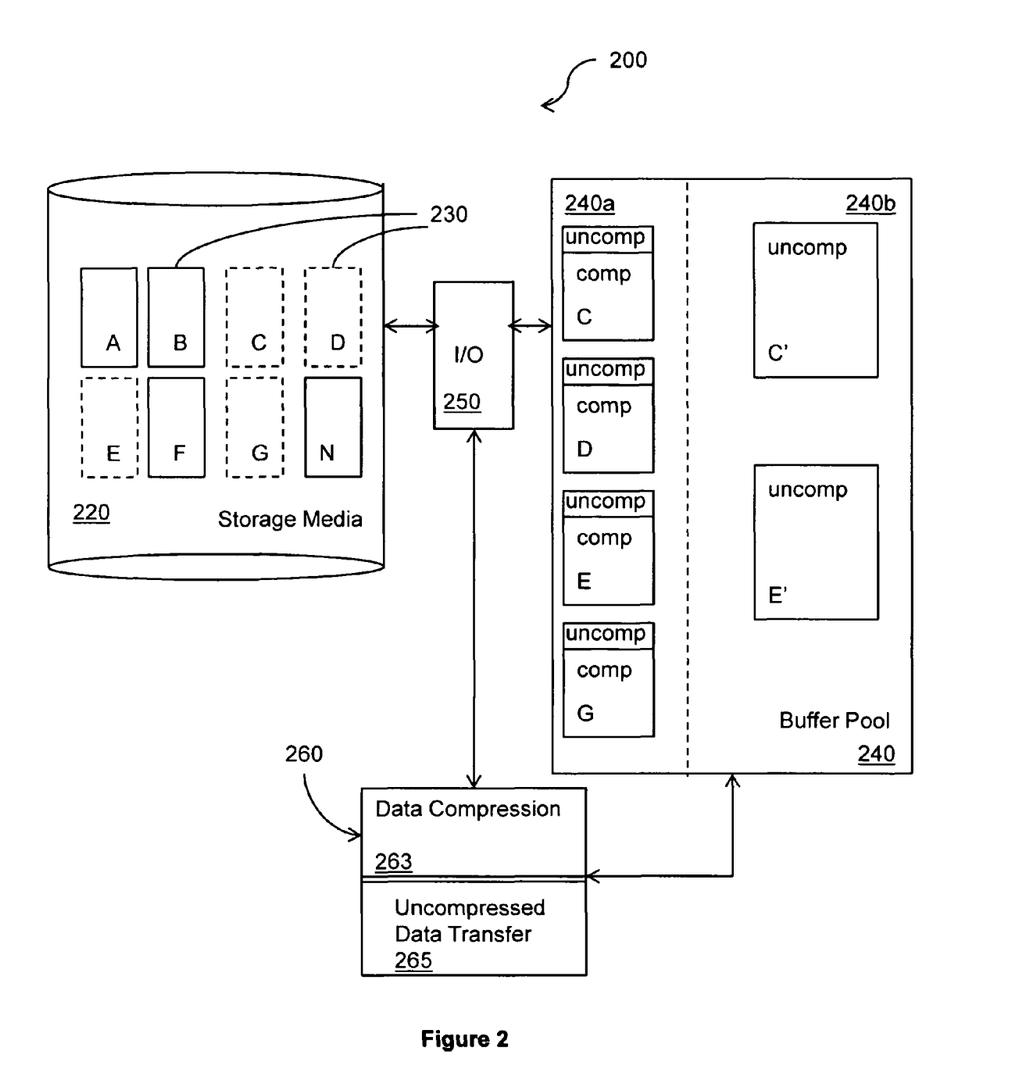
FIG. 2 illustrates an example embodiment of a system associated with constructing a compressed data page that includes uncompressed data fields.

FIG. 2 illustrates an example embodiment of a computing system 200 that includes a compressed page construction logic 260 that constructs compressed data pages from an uncompressed data page that includes uncompressed user records and uncompressed data fields. Compressed page construction logic 260 includes a data compression logic 263 that compresses the user records according to a compression scheme and stores them on a compressed data page. In one example embodiment, the compression scheme is the LZ77 compression scheme.

The compressed page construction logic 260 includes an uncompressed data transfer logic 265 that stores selected uncompressed data fields on the compressed data page such that the uncompressed data fields on the compressed data page can be updated in place on the compressed data page. In one example embodiment, the compressed page construction logic 260 includes a dense page directory compilation logic (not shown) that constructs and stores a dense page directory on the compressed data page. The dense page directory includes a list of entries corresponding to pointers to all user records on the compressed data page arranged in index order. In one example embodiment, the compressed page construction logic 260 includes a delete marker (not shown) that sets a delete mark flag that is part of the entry for a given user record on the compressed data page when the given user record is deleted. In one example embodiment, the compressed page construction logic 260 includes a modification logging component (not shown) that logs, on the compressed data page, changes to user records on the compressed data page for subsequent implementation on the user records.

In the computing system 200 shown in FIG. 2, includes a storage media 220 that stores compressed data pages (e.g., memory pages A-N) that have a fixed size. Compressed data pages are transferred into operating memory by an I/O component 250. The I/O component 250 stores the compressed data pages (e.g., compressed data pages C,D,E, and G) in a buffer pool 240 that stores both compressed and uncompressed data pages. The I/O component 250 also transfers compressed data pages back to the storage media 220. As can be seen best in the buffer pool 240, the compressed memory pages are stored in a buffer pool compressed page portion 240a and have an uncompressed portion and an uncompressed portion. Uncompressed data pages (e.g., uncompressed data pages C' and E') are stored in an uncompressed portion 240b of the buffer pool.

When it is necessary to uncompress a data page, the compressed version of the desired data page may already be in the buffer pool 240. In some cases, the desired data page may need to be retrieved from the storage media 220. In the described system, each uncompressed memory page (i.e., C' and E') has a corresponding compressed memory page (i.e., C and E) in the buffer pool 240. In various circumstances it is desirable to perform a compression action to construct a compressed data page that includes all of the changes that have been made to the uncompressed data page. One way to achieve this is to compress the uncompressed data page. To compress the uncompressed data page, the data compression logic 263 compresses user data on the uncompressed page and stores it on the resulting compressed data page. The uncompressed data transfer logic 265 transfers the uncompressed data field(s) to the compressed page. Another way to construct a compressed data page that includes all of the changes that have been made to the uncompressed data page is to uncompress the compressed user data on the compressed data page, make the changes recorded in the modification log to the uncompressed page, and then re-compressing the page.

One circumstance that may trigger a compression action is when it is predicted that the compressed data page that results from compression of an existing uncompressed data page will be close to exceeding the fixed compressed data page size limit. As changes are made to the uncompressed data page, the changes are logged on the modification log, which is part of the uncompressed data field portion of the compressed data page. When the changes that are logged on the modification log indicate that the compressed version of the uncompressed data page is close to the fixed compressed page size, the compression action may be triggered. Another circumstance that may trigger a compression action is when a data page is to be transferred to the storage media 220.

Figure 3:
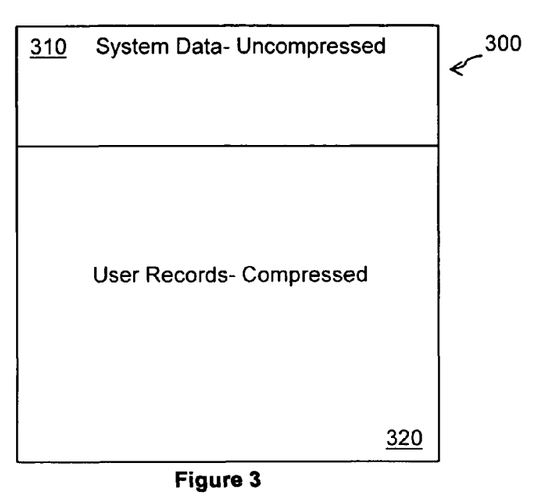
FIG. 3 illustrates an example embodiment of a compressed data page that includes uncompressed data fields.

FIG. 3 illustrates an example embodiment of a compressed data page 300. The compressed data page includes compressed user records 320 and uncompressed system data 310. As discussed above, in various example embodiments, the uncompressed data fields include a page header, a transaction identifier, a transaction undo log pointer, and a node pointer.

Figure 4:
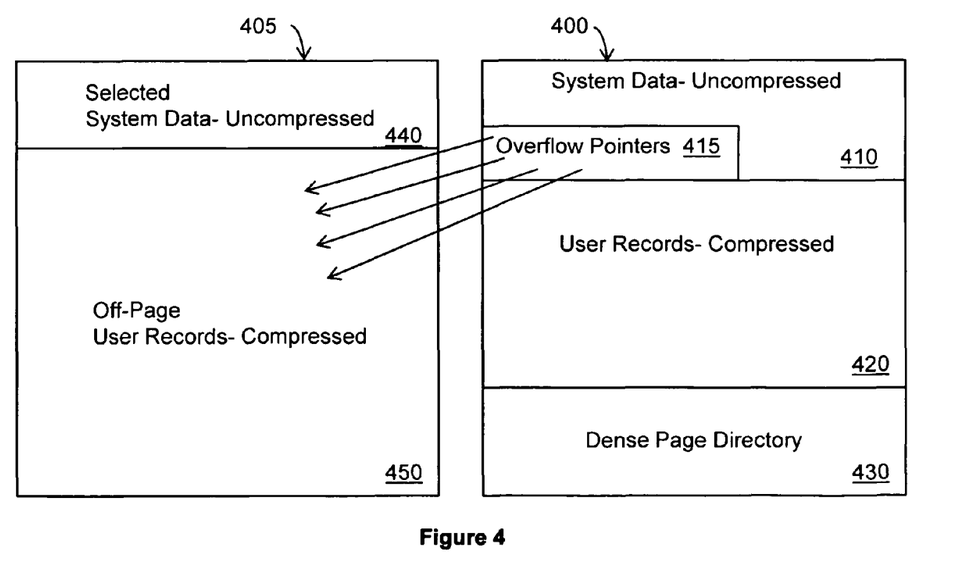
FIG. 4 illustrates an example embodiment of compressed data pages that include uncompressed data fields.

FIG. 4 illustrates a compressed data page 400 and a compressed overflow data page 405. The uncompressed data fields 410 on the compressed data page 400 include several off-page overflow pointers 415 that are stored in uncompressed form on the compressed data page. The off-page column pointers points to user data that is stored off page on the compressed overflow data page 405. The compressed data page 405 stores selected system data 440 in uncompressed form and compressed data records from the compressed data page 400. The compressed data page 400 includes a dense page directory that includes an array of pointers to each user record. The dense page directory is stored in uncompressed form on the compressed page 400. The dense page directory points to every user record contained on the page, including deleted records in a free list. The dense page directory is indexed in the collation order, i.e., in the order in which the record list is linked on the uncompressed page.

Figure 5:
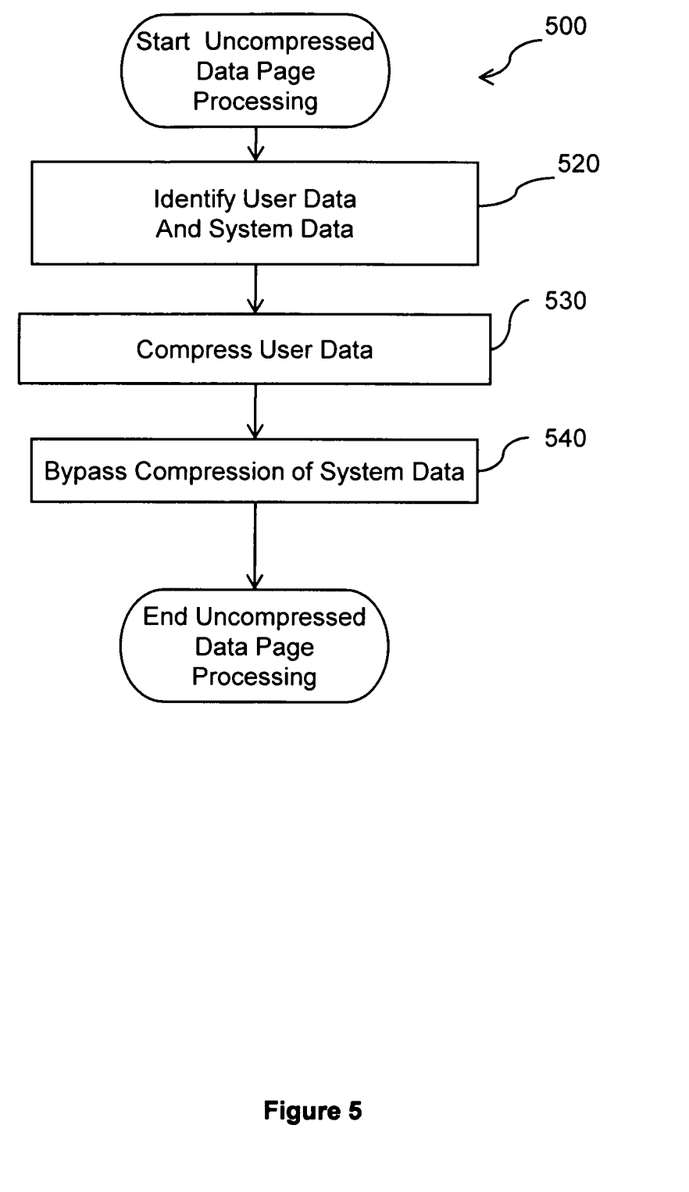
FIG. 5 illustrates an example embodiment of a method associated with constructing a compressed data page that includes uncompressed data fields.

FIG. 5 illustrates an example embodiment of a method of processing an uncompressed data page 500. At 520 user data and system data on the uncompressed data page is identified. At 530 the identified user data is compressed. At 540 compression of the identified system data is bypassed to maintain the system data in uncompressed form. In one example embodiment, the compressed user data and the uncompressed system data are stored in a compressed data page. In one example embodiment, the uncompressed system data is modified directly from the compressed page without uncompressing the compressed user data.

Figure 6:
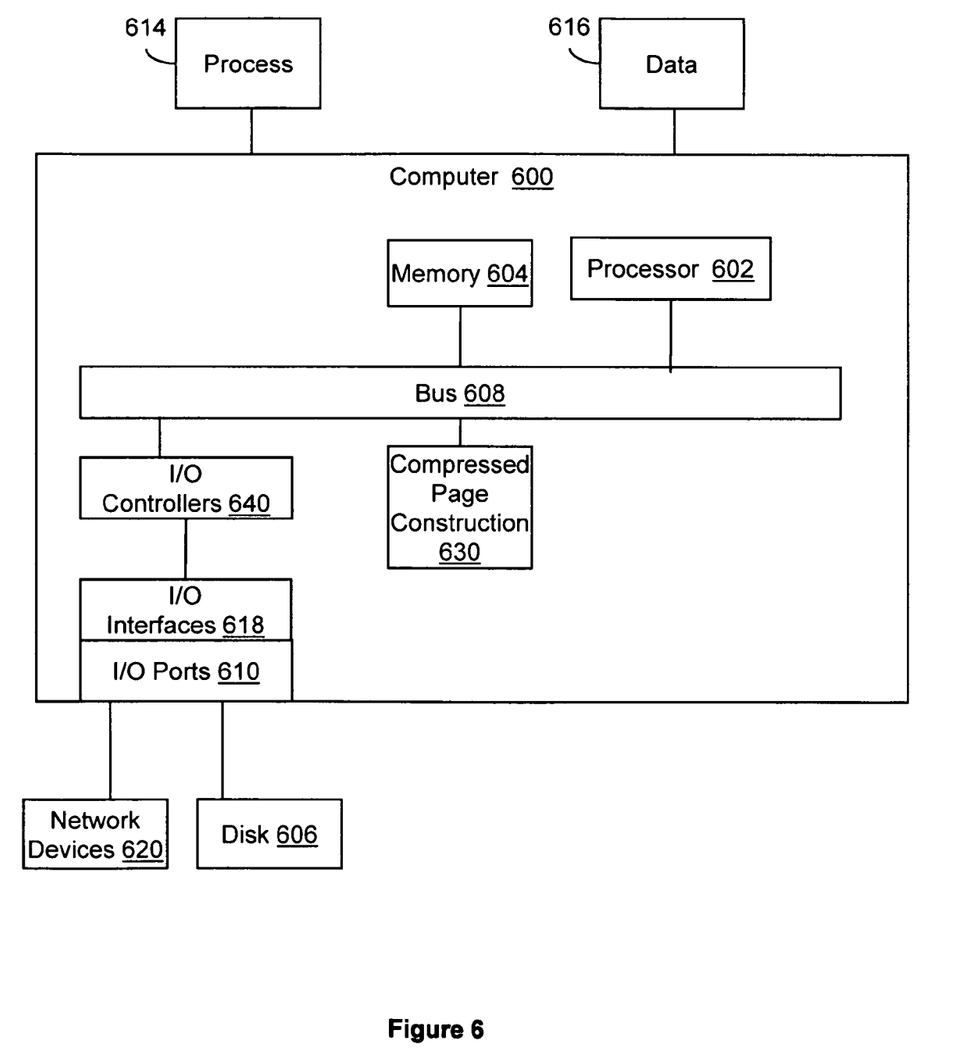
FIG. 6 illustrates an example computing environment in which example systems and methods, and equivalents, may operate.

The following acronyms used with reference to FIG. 6 are defined below:

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: Static RAM.
SDRAM: Synchronous Dynamic RAM ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a compressed page construction logic 630 configured to facilitate compressed page construction. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software, firmware) for compressed page construction.

The means may be implemented, for example, as an ASIC programmed to construct compressed data pages. The means may also be implemented as computer executable instructions that are presented to computer 600 as data 616 that are temporarily stored in memory 604 and then executed by processor 602.

Logic 630 may also provide means (e.g., hardware, software, firmware) for compressed page construction.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, Flash ROM, and so on. Volatile memory may include, for example, RAM, SRAM, DRAM, SDRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, IEEE 1394, USB, Ethernet IEEE 802). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A computer-implemented method performed by a computer where the computer includes at least a processor for executing instructions from a memory, the method comprising:
    transferring a compressed data page from a storage device that is not part of an operating memory of the computer to the operating memory of the computer;
    uncompressing the compressed data page and storing a resulting uncompressed data page that stores user records and system data in the operating memory;
    accessing data in the uncompressed data page;
    compressing the uncompressed data page to produce a corresponding second compressed data page by:
        compressing the user records to produce compressed user records,
        storing the compressed user records on the second compressed data page,
        storing the system data in at least one uncompressed data field on the second compressed data page, and
        storing the second compressed data page in the storage device,
    wherein the uncompressed data page includes a sparse page directory that includes pointers to a subset of user records;
    constructing a dense page directory on the compressed data page that includes an array of pointers to each user record stored on the compressed data page and arranged in index order; and
    associating a sparse directory flag with each pointer in the array of pointers that points to a user record included in the sparse page directory.

2. The computer-implemented method of claim 1, wherein the at least one uncompressed data field includes one or more page header fields and wherein the one or more page header fields are stored in uncompressed form on the compressed data page.

3. The computer-implemented method of claim 1 wherein the at least one uncompressed data field includes a transaction identifier and wherein the transaction identifier is stored in uncompressed form on the compressed data page.

4. The computer-implemented method of claim 1 wherein the at least one uncompressed data field includes a transaction undo log pointer and wherein the transaction undo log pointer is stored in uncompressed form on the compressed data page.

5. The computer-implemented method of claim 1 wherein the at least one uncompressed data field includes a node pointer and wherein the node pointer is stored in uncompressed form on the compressed data page.

6. The computer-implemented method of claim 1 wherein the at least one uncompressed data field includes an off-page column pointer and wherein the off-page column pointer is stored in uncompressed form on the compressed data page.

7. The computer-implemented method of claim 1 comprising associating a delete mark flag with each pointer in the array such that the delete mark flag may be updated in place on the compressed data page.

8. The computer-implemented method of claim 1 further comprising including free space in the compressed data page such that the compressed data page occupies a predetermined amount of memory.

9. A computer-implemented method performed by a computer where the computer includes at least a processor for executing instructions from a memory, the method comprising:
    transferring a compressed data page from a storage device that is not part of an operating memory of the computer to the operating memory of the computer;
    uncompressing the compressed data page and storing a resulting uncompressed data page that stores user records and system data in the operating memory;
    accessing data in the uncompressed data page;
    compressing the uncompressed data page to produce a corresponding second compressed data page by:
        compressing the user records to produce compressed user records,
        storing the compressed user records on the second compressed data page, and
        storing the system data in at least one uncompressed data field on the second compressed data page;
    storing the second compressed data page in the storage device;
    recording changes to user records stored on the compressed data page in a modification log;
    predicting a resultant size of a re-compressed data page based on the modification log; and
    when the predicted resultant size of the re-compressed data page reaches a predetermined size, performing a recompression operation, wherein the recompression operation comprises decompression of compressed user data, modification of the decompressed user data to reflect the changes in the modification log, and recompression of the modified user data to produce a subsequent compressed data page.

10. The computer-implemented method of claim 9 comprising splitting the re-compressed data page when the size of the re-compressed data page exceeds the predetermined size.

11. The computer-implemented method of claim 9 comprising compressing an uncompressed data page corresponding to the compressed data page to produce a re-compressed data page when a predicted resultant size of the re-compressed data page reaches a predetermined size, wherein the predicted resultant size is determined based on the modification log.

12. A computing system that constructs compressed data pages from an uncompressed data page that includes uncompressed user records and uncompressed system data, the system comprising:
    a processor connected to a non-transitory computer readable medium by a communication path;
    operating memory for the computing system comprising a non-transitory storage media, where the operating memory is configured to store uncompressed data pages that include user records and system data;
    a storage device, that is not part of the operating memory, where the storage device is configured to store compressed data pages that include both compressed user records and uncompressed system data;
    an I/O component configured to transfer compressed data pages between the storage device and the operating memory of the computer;
    a page construction logic stored on the non-transitory computer readable medium and including instructions that when executed by the processor cause the processor to compress an uncompressed data page in the operating memory to produce a second compressed data page, where the page construction logic comprises:
        a data compression logic configured to compress the user records and store the compressed user records on the second compressed data page, and
        an uncompressed data transfer logic configured to store selected uncompressed system data on the second compressed data page in uncompressed form, and
        where the page construction logic is configured to store the second compressed data page in the storage device; and
    a modification logging logic stored on the non-transitory computer readable medium and including instructions that when executed by the processor cause the processor to log, on the compressed data page, changes to user records on the compressed data page in a modification log for subsequent implementation on the user records, wherein the modification logging logic is also configured to predict a resultant size of a re-compressed data page based on the modification log, and
    when the predicted resultant size of the re-compressed data page reaches a predetermined size, the modification logging logic is configured to perform a recompression operation, wherein the recompression operation comprises decompression of the compressed user records, modification of the decompressed user records to reflect the changes in a modification log, and recompression of the modified user records to produce a subsequent compressed data page.

13. The computing system of claim 12 further comprising a dense page directory compilation logic stored on the non-transitory computer readable medium and including instructions that when executed by the processor cause the processor to construct and store a dense page directory on the compressed data page, wherein the dense page directory includes a list of entries corresponding to pointers to all user records on the compressed data page arranged in index order.

14. The computing system of claim 13 further comprising a delete marker that sets a delete mark flag that is part of an entry for a given user record on the compressed data page when the given user record is deleted.

15. The computing system of claim 12 further comprising a buffer pool that stores the compressed and uncompressed data pages.

16. The computing system of claim 12 wherein:

the data compression logic comprises means for compressing user data on an uncompressed data page;

the data compression logic comprises means for storing compressed user data on a compressed data page;

the uncompressed data transfer logic comprises means for storing an uncompressed system information field on the compressed data page; and the uncompressed data transfer logic comprises means for updating the uncompressed system information field on the compressed data page.

17. A non-transitory computer-readable medium storing computer-executable instructions that when executed by a computer cause the computer to:

transfer a compressed data page to an operating memory of the computer from a storage device that is not part of the operating memory of the computer;

uncompress the compressed data page in the operating memory of the computer to produce an uncompressed data page, where the uncompressed data page includes uncompressed user records;

access at least one record in the uncompressed data page;

compress the uncompressed data page to produce a second compressed data page by:

compressing the user records to produce compressed user records, storing the compressed user records on the second compressed data page, storing uncompressed system data in uncompressed form on the second compressed data page, and storing the second compressed data page including the compressed user records and the uncompressed system data in the storage device;

record changes to user records stored on the compressed data page in a modification log;

predict a resultant size of a re-compressed data page based on the modification log; and when the predicted resultant size of the re-compressed data page reaches a predetermined size, perform a recompression operation, wherein the recompression operation comprises decompression of the compressed user records, modification of the decompressed user records to reflect the changes in the modification log, and recompression of the modified user records to produce a subsequent compressed data page.

18. The non-transitory computer-readable medium of claim 17 wherein the instructions further comprise instructions for splitting the re-compressed data page when the size of the re-compressed data page exceeds the predetermined size.

19. The non-transitory computer-readable medium of claim 17 wherein the instructions further comprise instructions for including free space in the compressed data page such that the compressed data page occupies a predetermined amount of memory.

20. A computer-implemented method performed by a computer where the computer includes at least a processor for executing instructions from a memory, the method comprising:

transferring, via at least the processor, compressed data pages between a storage device and an operating memory of the computer;

compressing, via at least the processor, an uncompressed data page in the operating memory to produce a compressed data page by:

compressing user records and storing the compressed user records on the compressed data page, storing selected uncompressed system data on the compressed data page in uncompressed form, and storing the compressed data page in the storage device;

logging via at least the processor, on the compressed data page, changes to the user records on the compressed data page in a modification log for subsequent implementation on the user records;

predicting, via at least the processor, a resultant size of a re-compressed data page based on the modification log; and when the predicted resultant size of the re-compressed data page reaches a predetermined size, performing a recompression operation via at least the processor, wherein the recompression operation comprises decompression of the compressed user records, modification of the decompressed user records to reflect the changes in a modification log, and recompression of the modified user records to produce a subsequent compressed data page.

* * * * *